United States Patent [19]

Zettergren

[11] 4,361,836

[45] Nov. 30, 1982

[54] SAFETY DEVICE AT REMOTE CONTROL OF HYDRAULIC OR PNEUMATIC MACHINE TOOLS

[76] Inventor: Ted Zettergren, Kungsgärden 3402, 870 52 Nyland, Sweden

[21] Appl. No.: 193,536

[22] Filed: Oct. 3, 1980

[30] Foreign Application Priority Data

Oct. 11, 1979 [SE] Sweden ................................ 7908451

[51] Int. Cl.$^3$ ........................ H04Q 9/00; H01H 47/32

[52] U.S. Cl. ............................ 340/825.2; 340/825.63; 361/193

[58] Field of Search ............ 340/151, 147 R, 147 MT; 371/62, 71; 361/193, 166; 318/563, 565; 307/32, 38

[56] References Cited

U.S. PATENT DOCUMENTS

| | | | |
|---|---|---|---|
| 3,943,973 | 3/1976 | Zettergren | 340/147 MT |
| 3,946,287 | 3/1976 | Hopkins | 361/193 |
| 4,065,747 | 12/1977 | Patten et al. | 340/151 |
| 4,150,416 | 4/1979 | Heppenstall et al. | 361/193 |

*Primary Examiner*—Donald J. Yusko

*Attorney, Agent, or Firm*—Silverman, Cass & Singer, Ltd.

[57] ABSTRACT

A safety device at remote control of hydraulic or pneumatic machine tools where electric signals are used for controlling hydraulic or pneumatic valves, for example machines comprising a selector valve for different hydraulic functions, which is controlled by electrohydraulic or electropneumatic converters (N), and where a control unit is capable by means of electric impulses to transfer orders via a cable to a receiver unit (H), which is capable to control said converters (N) via signal converters (L) and amplifiers (M) for amplifying received signals.

According to the invention the output of the receiver unit (H) is connected to a zero-detector (P), which is capable, after a certain predetermined time from detection that there is no output signal from the receiver unit (H), to detect whether or not there is an output signal from the respective amplifier (M) or corresponding means, and when there is an output signal from the respective amplifier (M), although there is no corresponding signal on the output of the receiver unit (H), to break the current supply to said amplifier (M).

8 Claims, 4 Drawing Figures

SAFETY DEVICE AT REMOTE CONTROL OF HYDRAULIC OR PNEUMATIC MACHINE TOOLS

Figure 1:
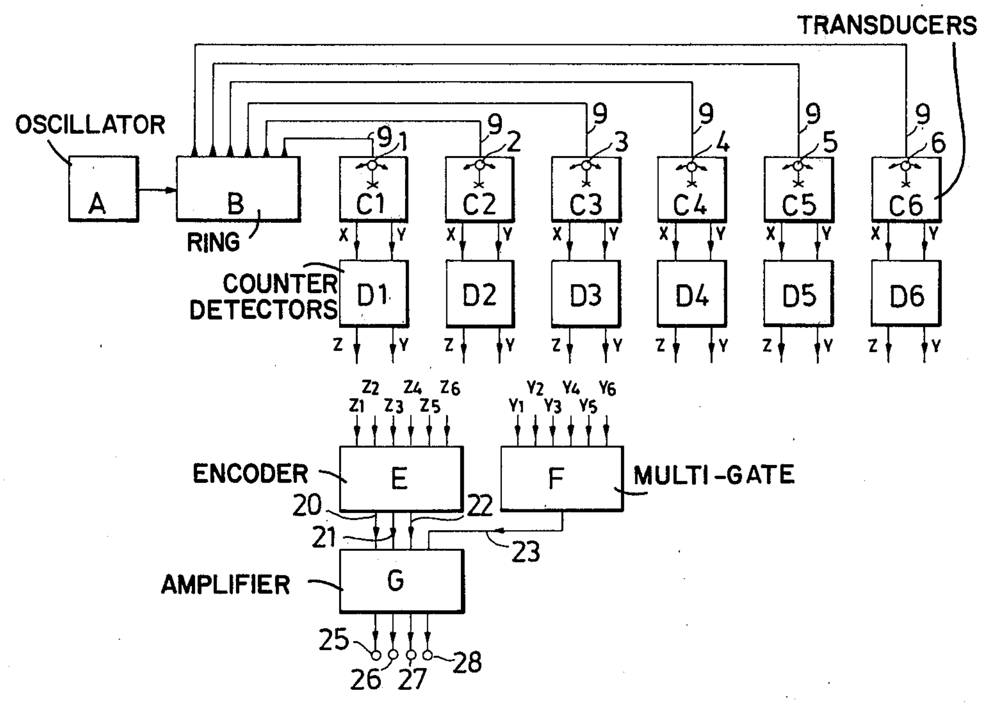

This invention relates to a safety device at the remote control of hydraulic or pneumatic machine tools, especially load-handling machines.

It is often desired, that at such machines the control can be effected from the most suitable place, for example for eliminating the risk of accidents and for enabling the driver to attach the load all by himself.

At a known type of devices of this kind the hydraulic or pneumatic equipment is located at the machine tool and connected to a portable control unit via an electrical cable. In the hydraulic or pneumatic equipment are comprised a plurality of proportional electrohydraulic or electropneumatic converters, which serve as adjusting means and replace or complete the normal lever control. The communication between the control unit and the converters is effected through said electric cable where the control currents are transferred each in a conductor to the respective converter.

The equipment can comprise a great number of converters, and for each converter a conductor is required. The cable, therefore, is heavy and clumsy.

At another known device a time-division multiplex system is used, which requires only three conductors for signal transfer. This system, however, has the one great disadvantage, that electric interference can give rise to self-actuation of the system, due above all to the fact that address changes for codes can occur, because an interference in a pulse train ingoing to the system is interpreted as an order to a decoder there located to shift channel. The result will be entirely uncontrolled output voltages from the control circuit.

The same applies when a component in toggle circuits, decoders or amplifiers is interfered or breaks.

These drawbacks with respect to safety are eliminated entirely by the present invention, which, besides, offers very low manufacturing costs at the same time as it meets very high requirements on the control safety.

The present invention, thus, relates to a safety device at remote control of hydraulic or pneumatic machine tools, where electric signals are used for controlling hydraulic or pneumatic valves, for example machines comprising a selector valve for different hydraulic functions which is provided with a number of spring-centered slides and two electrohydraulic or electropneumatic converters connected to each slide, a control unit capable to transfer orders by electric impulses via a cable to a receiver unit, which in its turn is capable to control said converters, the output of said receiver unit connected to signal converters and amplifiers for amplifying received signals and controlling said converters. The invention is characterized in that the output of the receiver unit also is connected to a zero detector, which is capable, after a certain predetermined time from detecting that there is no output signal from the receiver unit, to detect whether or not there is an output signal from the respective amplifier or corresponding means, and when there is an output signal from the respective amplifier, although there is no corresponding signal on the output of the receiver unit, to break the current supply to said amplifier.

Figure 2:
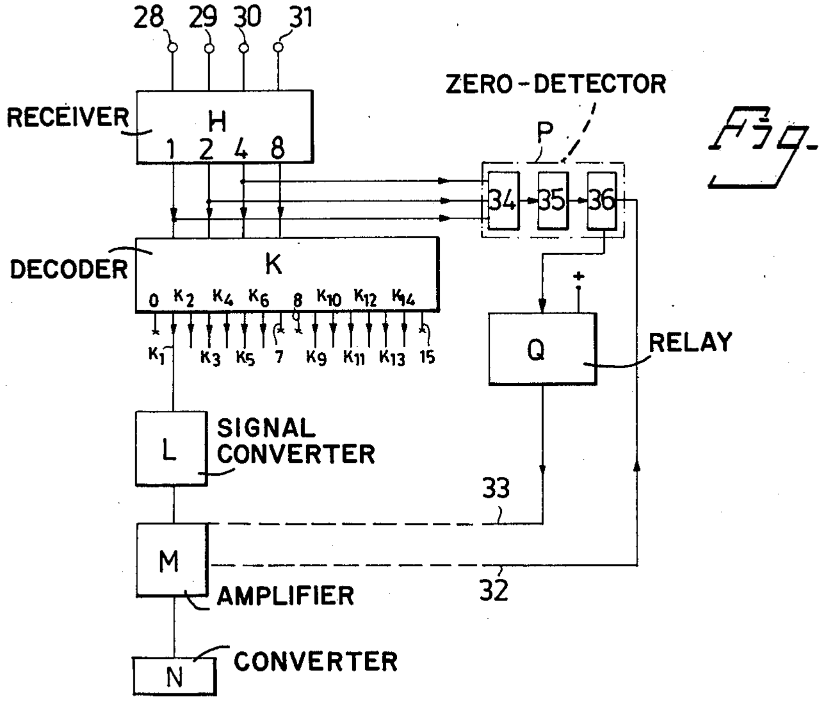
Figure 3:
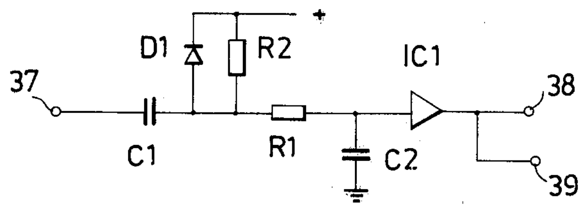
Figure 4:
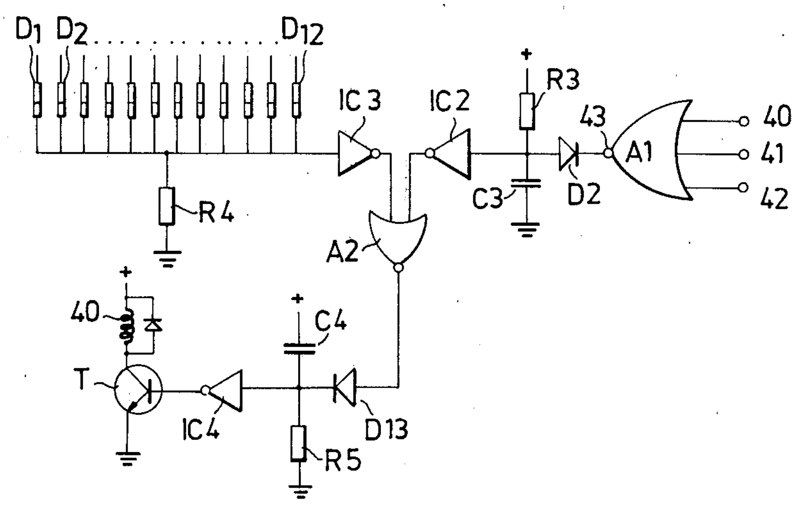

The invention is described in greater detail in the following, with reference to the accompanying drawings where, in order to exemplify an application of the invention also a system for transferring electric impulses is shown, and in which FIG. 1 is a block diagram of a control unit according to said system, FIG. 2 is a block diagram of a receiver and signal converting unit according to said system, to which the invention is applied, FIG. 3 is a detail view of a block in FIG. 2, FIG. 4 is a detail view of a block in FIG. 2.

The present invention is described below by way of example in connection with a device according to a system for controlling the hydraulics, in connection with a selector valve, which is provided with six conventional spring-centered slides (not shown, each with a position change proportional to the lever deflection of the control unit. It is obvious, however, that the invention can be applied to other systems.

The device can be applied also to pneumatic circuits.

Each slide can be actuated from the spring-centered central position to an end position by means of electrohydraulic or electropneumatic converters N. One converter moves the slide from the central position in one direction, and the other converter moves the slide in the other direction. These converters, which in the example below are twelve in number, replace or complete the direct lever control of the selector unit.

The converters can be of a suitable known type and be arranged to convert an electric pulse train from a control circuit into a means pressure, which by balancing against the spring-centered slides of the selector valve gives rise to a slide deflection corresponding to pulse length or pulse height.

According to the system, address codes are transferred from a control unit located in a place other than at the machine in question by means of a plurality of conductors in a control cable, one address at a time and in series, to a receiver unit at the machine, where each address is allotted a definite space. The address code is built up so as to agree with standardized so-called BCD-code, so that there is a possibility of controlling the receiver unit, instead of by the control unit, by a computer. A computer control can be switched-in at the same time as a manual control by the control unit.

The receiver unit is arranged to decode received code and thereafter to actuate via amplifier the addressed converter which, as mentioned, is capable to actuate the selector valve.

The control unit may have any suitable design, but preferably it is designed so that in this example six levers are provided, which can be moved from a spring-centered neutral position in two directions. Each lever here corresponds to a slide in the selector valve. Upon movement of a lever in one direction, a converter actuates a slide, and upon movement of the lever in the other direction the other one of the two converters actuates said lastmentioned slide.

The said system is such, that for the control of each slide two signals are received from the control unit, one signal indicating the direction of the movement of a lever, and one signal indicating the size of the lever deflection. The signals are maintained all the way to the respective amplifier. Of course, one signal can be generated which indicates the direction, and a second signal which indicates the opposite direction and deflection.

At said mentioned known time-division multiplex system such signal continuity does not exist, and the system, therefore, is sensitive to electric interferences, resulting in address changes and/or changes in size of said deflections, which in its turn gives rise to uncontrolled operations of the machine.

The block diagram of the control unit shown in FIG. 1 comprises an oscillator A, which controls a ring counter B, which emits scanning pulses in turn to transducers C1 to C6 of difference type. Th oscillator A operates, for example, with a frequency of 300 c/s, whereby through the 6-channel ring counter 50 c/s trigger signals to each one of the difference transducers are obtained.

Each transducer is controlled by a lever 1–6. The transducers C1–C6 are capable, in the manner described below, to emit two output signals x and y, which are of equal length when the mechanic lever 1–6 is in neutral position. When the lever 1–6 is moved in one direction, the pulse length x decreases while the pulse length y increases. The relation is inverse when the lever 1–6 is moved in the opposite direction.

The difference in pulse length is proportional to the lever deflection. The difference and the direction are detected in the detector D1–D6, which are capable to emit a signal z indicating the difference in pulse length and a signal y when the pulse length y exceeds the pulse length x.

The output signals z thus received, and indicating the deflection of a lever, from the detectors D1–D6 are converted in an encoder E into so-called BCD-code.

The output signals y received, and indicating the direction of a lever 1–6, from the detectors D1–D6 are collected in a multi-gate F to serve as the fourth bit of the BCD-code, viz. the bit 8. The gate F can be a so-called 8-input-or gate.

The outputs 20,21,22,23 from the encoder E and multi-gate F are connected to an amplifier, so-called line-driver, the outputs 24,25,26,27 of which are connected via said cable to the inputs 28,29,30,31 of the receiver unit.

This device, thus, renders fourteen proportional addressings possible, viz, 1–7 and, when F is actuated, 9–15. When the system is expanded to five conductors in the cable, thirty addresses can be obtained, with six conductors sixtytwo addresses, a.s.o.

The receiver unit is comprised in a line receiver H, which feeds ingoing address codes to a decoder K, which is a so-called 4/16-decoder.

In the decoder K the BCD-code is decoded in usual manner, and the decoder is capable to emit on its outputs $K_1$–$K_6$ a signal corresponding to the output signal X of the respective transducer C1–C6 when the output signal y of the respective decoder is zero, and on its outputs $K_9$–$K_{14}$ to emit a signal corresponding to the output signal X of the respective transducer C1–C6 when the output signal y of the respective decoder is different from zero.

The outputs $K_1$–$K_6$ and $K_9$–$K_{14}$ are connected each to a signal converter L and amplifier M, of which amplifiers each is connected to one of said twelve converters N. In FIG. 2, however, only one signal converter L, one amplifier M and one converter N are shown.

The signal converter L, according to one embodiment, is a pulse extender. The pulses appearing on the respective output $K_1$–$K_6$, $K_9$–$K_{14}$ have a duration, which in the above example at maximum is one three-hundredth part of a second and is repeated fifty times per second. The signal converter L can be designed to extend the pulses so that at full deflection of a lever 1–6 a continuous signal out from the signal converter is received. The output signal from the signal converter is the input signal in the amplifier M, which in its turn controls the respective converter N so that the slide associated therewith in the selector valve is displaced.

The signal converter, instead of exteding the pulses, can be arranged so as to emit a continuous signal, the voltage level of which depends on the pulse length on the respective output of the decoder K, or be arranged so as to convert the pulse length into a suitable pulse train.

The above system consists of standard components and is illustrated in detail in Swedish patent application 7908450-5.

According to the present invention, the line receiver H comprises a pulse length comparison circuit, which transmits pulses onward to the decoder K only when the pulses have correct length.

When the pulses are too short, the line receiver does not emit a corresponding output signal, and when the pulses are too long, the line receiver blocks the respective output concerned. When the pulses are incorrect, thus, the respective output is blocked, thereby providing an effective protection against short circuits and other faults in the control unit or cable.

In FIG. 2 also a zero-detector P is shown.

The zero-detector P is connected to all amplifiers M via conductors 32 (in FIG. 2 only one of twelve conductors is shown) and is connected to outputs of the line receiver H corresponding to said deflection of the transducers. The zero-detector P is capable, after a certain predetermined time from zero-detection, i.e. there is no signal on any of the outputs in the line receiver, to detect whether or not there is an output signal from the respective amplifier M. The said time is the maximum pulse extension time in the signal converting circuit L. When there is an output signal from an amplifier M after the predetermined time, although there is no corresponding signal on the outputs of the line receiver H, the zero-detector P is capable to break the control current to a relay Q, which thereby interrupts the voltage feed to the amplifiers M via conductors 33.

In FIG. 2 the zero-detector P is shown to comprise a gate 34, a delay circuit 35 and a comparison circuit 36.

In FIG. 3 the input protection comprised in the receiver H is shown in detail.

The input protection comprises a capacitor C1, a resistor R1 connected in series and a Smith-trigger IC1. A diode D1 and a resistor R2 are connected in parallel thereto to positive potential. Between the resistor R2 and IC1 connection to earth potential is provided through a capacitor C2. An input 37 is connected to one of the three outputs from a receiver circuit or the like in the line receiver which emit a signal concerning said deflection of a lever, i.e. is connected to one of the inputs 28,29,30 when the input 31 is assumed to be the one which emits a signal concerning said direction of a lever.

Three identical circuits, thus, are provided, one of which is shown in FIG. 3, and each circuit is connected to one of said three inputs 28,29,30 to the line receiver.

The function of the input protection is as follows. Without input signal the capacitor C2 is positively charged through the resistors R1,R2, and the output of the Smith-trigger IC1 is low.

At a signal on the input of the circuit which is negative, C2 is discharged through R2. When the signal pulse exceeds in length the time constant for the partial circuit R2-C2, the Smith-trigger IC1 is activated and switches over so that its output is high. When the signal pulse is too short, i.e. shorter than the discharge time for the partial circuit R2-C2, the Smith-trigger never will switch over, and nothing happens at its output. The part of the input protection described so far, thus, has the effect that only signal pulses of a certain minimum length, which is determined by the discharge time for the partial circuit R2-C2, are parmitted to pass through.

A negative signal pulse on the input 37 has the effect that the right-hand side of the capacitor C1 is low. C1 is charged through R1. When the pulse is long, the right-hand side of C1 will be so high that the Smith-trigger IC1 switches over although the pulse has not finished. The maximum pulse length, thus, is determined by the charging time for the partial circuit C1-R1.

Through the input circuit, thus, a shortest and a longest pulse length are determined which are to pass through the circuit and to emit a signal to the outputs 38,39 of the Smith-trigger IC1. One output 39 is connected to the decoder K, and the other output is connected to the zero detecting circuit P.

Each of the outputs of the three input circuits corresponding to the output 38 is connected to an inverter or-gate A1, which in FIG. 2 is the gate 34. The zero detecting circuit P further comprises a diode D2 and a Smith-trigger IC2 in series therewith, the output of which is connected to a second inverted or- gate A2. Between the diode D2 and IC2 a resistor R3 and a capacitor C3 are provided, of which the resistor R3 is connected to positive potential, and the capacitor C3 is connected to earth potential.

From each of the amplifiers M, preferably from its final step, a final transistor or the like is connected via a diode D4-D12 to a single Smith-trigger IC3, the output of which is connected to said second inverted or- gate A2. The diodes D4-D12 are connected to earth via a resistor R4. The gate A2, thus, is a comparison circuit. The output of the gate A2 is connected via additional Smith-triggers IC4 connected in series to the base of a transistor T, which supplies current to the coil 40 in said relay Q. Between said lastmentioned Smith-trigger IC4 and a diode D13 located ahead thereof and in series therewith, a capacitor C4 is connected to positive potential, and a resistor R5 is connected to earth potential.

The function of the zero detecting circuit is as follows. On one or several of the inputs 40,41,42 of the first gate A1 there is a signal when a scanning signal scans deflection of a lever 1-6. When there is a signal, the output 43 of the gate A1 is low. When there is no input signal and, thus, no deflection of a lever, the output 43 is high, and the capacitor C3 is charged. When C3 has been charged after some time, which is determined by the circuit R3-C3, the output of the Smith-trigger IC2 shifts from having been high to being low. The circuit R3-C3, thus, is a delay circuit, which in FIG. 2 is designated by 35 and which is capable to establish said predetermined time, which substantially corresponds, for example, to a maximum pulse length to the amplifiers M from the signal converters L.

When there is a signal from one or more of the diodes D1-D12, the output of the Smith-trigger IC3 is low, and when there is no signal from the diodes D1-D12, the output on IC is high.

The gate A2 is the comparison circuit, which in FIG. 2 is designated by 36. The gate A2 is capable to emit a signal only when both its inputs are low, i.e. when some final step of the respective final steps of the amplifiers M conducts current and when at the same time there is no input signal extended through the circuit R3-C3 to the line receiver unit H from the control unit.

When the gate A2 emits a signal, the additional Smith-trigger IC4 switches over so that its output is low, whereby the transistor T ceases to conduct current to the coil 40, and the relay Q breaks the current to the amplifiers M. The circuit C4-R4 provides a switch-off delay for the relay whereby the relay is prevented from fluttering when there is pulsating faulty signal from said final step.

The zero indicating circuit, thus, implies that when there is no signal from the control unit or, more correctly, when there is no extension of such a signal, i.e. that a lever 1-6 does not indicate deflection, and at the same time a final step drives a converter, the voltage to the amplifiers M is interrupted, and the driving of the converter ceases.

A high degree of safety, thus, is achieved in that the line receiver is programmed not to accept pulses other than correct ones, and the zero-detector P is arranged so as to break the voltage feed to the amplifiers M when the output signal therefrom does not agree with the output signal from the line receiver H.

The circuits of the ones mentioned above which are not shown in detail, are commercially available standard circuits.

The invention must not be regarded restricted to the embodiments described above, but can be varied within the scope of the attached claims.

I claim:

1. A safety device at the remote control of hydraulic or pneumatic machine tools where electric signals are used for controlling hydraulic or pneumatic valves, typically in machines comprising a selector valve for different hydraulic functions, which is provided with a plurality of spring-centered slides and two electrohydraulic or electropneumatic converters (N) connected to each slide, where a control unit is provided to transfer orders to a receiver unit (H), which in its turn controls said converters, and the output of said receiver unit is connected to signal converters (L) and amplifiers (M) for amplifying received signals and controlling said converters (N), wherein the output of the receiver unit also is connected to a zero-detector (P), which is capable, after a certain predetermined time from detection that there is no output signal from the receiver unit (H), to detect whether or not there is an output signal from the respective amplifier (M), and when there is an output signal from the respective amplifier (M) although there is no corresponding signal on the output of the receiver unit (H), to break the current supply to said amplifier (M).

2. A safety device as designed in claim 1, wherein the zero-detector (P) comprises a gate (34) connected to the output of the receiver unit (H), a time delay circuit (35) and a comparison circuit (36), which is capable to receive a signal from the time delay circuit (35) as well as from the final step or corresponding of the respective amplifier (M), and to compare the signal occurrence from the output of the receiver unit (H) with the signal occurrence from the final step of the amplifiers (M).

3. A safety device as defined in claim 1 or 2, wherein the zero detecting circuit (P) comprises an inverted or-gate (A1 and 34) connected to the outputs of the receiver unit (H), the output of said gate connected to a second inverted or-gate (A2) and comprises a conductor (D1-D12) from the final step of each amplifier (M) connected to said second inverted or-gate (A2), and that the output of said second inverted or-gate (A2) controls a current supply relay (Q) for said amplifiers (M), so that when there is a signal from the final step of any amplifier (M) but not from the output of the receiver unit (H), the current supply to the amplifiers (M) is broken by said current supply relay (Q).

4. A safety device as defined in claim 1 or 2, wherein the output of the receiver unit (H) is arranged to be scanned only with respect to signals, which represent the size of the deflection of manual operating members included in said control unit.

5. A safety device as defined in claim 1 or 2 wherein pulses are used for transferring information from the control unit to the receiver unit, and further wherein the output of the received unit (H) comprises an input protection to said signal converting circuits (L) and, respectively, zero-detector (P), which input protection comprises two RC-circuits (R1,C1, R2, C2 ) capable to permitthe passage of pulses only, the duration of which exceeds a time determined by one of the RC-circuits (R2,C2) and are shorter than a time determined by the other one of the RC-circuits (R1,C1).

6. A safety device as defined in claim 3, wherein the output of the receiver unit (H) is arranged to be scanned only with respect to signals, which represent the size of the deflection of manual operating members included in said control unit.

7. A safety device as defined in claim 3, wherein pulses are used for transferring information from the control unit to the receiver unit, and further wherein the output of the receiver unit (H) comprises an input protection to said signal converting circuits (L) and, respectively, zero-detector (P), which input protection comprises two RC-circuits (R1, C1, R2, C2) capable to permit the passage of pulses only, the duration of which exceeds a time determined by one of the RC-circuits (R2, C2) and are shorter than a time determined by the other one of the RC-circuits (R1, C1).

8. A safety device as defined in claim 4, wherein pulses are used for transferring information from the control unit to the receiver unit, and further wherein the output of the receiver unit (H) comprises an input protection to said signal converting circuits (L) and, respectively, zero-detector (P), which input protection comprises two RC-circuits (R1, C1, R2, C2) capable to permit the passage of pulses only, the duration of which exceeds a time determined by one of the RC-circuits (R2, C2) and are shorter than a time determined by the other one of the RC-circuits (R1, C1).

* * * * *